(12) United States Patent
Naim et al.

(10) Patent No.: US 9,129,502 B2
(45) Date of Patent: Sep. 8, 2015

(54) REMOTE UNIT LINK QUALITY MONITORING

(75) Inventors: Yaron Naim, Herzeliya (IL); Jochen Kilian, Rothenburg ob der Tauber (DE); Yuval Itkin, Zoran (IL)

(73) Assignee: DSP Group LTD., Herzeliya (IL)

( * ) Notice: Subject to any disclaimer, the term of this patent is extended or adjusted under 35 U.S.C. 154(b) by 151 days.

(21) Appl. No.: 13/808,601

(22) PCT Filed: Jul. 12, 2010

(86) PCT No.: PCT/IL2010/000556
§ 371 (c)(1),
(2), (4) Date: Jan. 7, 2013

(87) PCT Pub. No.: WO2012/007932
PCT Pub. Date: Jan. 19, 2012

(65) Prior Publication Data
US 2013/0342345 A1    Dec. 26, 2013

(51) Int. Cl.
*G08B 21/02* (2006.01)
*H04B 17/23* (2015.01)

(52) U.S. Cl.
CPC ........ *G08B 21/0247* (2013.01); *G08B 21/0208* (2013.01); *H04B 17/23* (2015.01)

(58) Field of Classification Search
None
See application file for complete search history.

(56) References Cited

U.S. PATENT DOCUMENTS

| | | | |
|---|---|---|---|
| 4,598,272 A * | 7/1986 | Cox | 340/539.21 |
| 5,289,163 A * | 2/1994 | Perez et al. | 340/539.32 |
| 5,485,163 A * | 1/1996 | Singer et al. | 342/457 |
| 5,708,417 A * | 1/1998 | Tallman et al. | 340/539.23 |
| 5,841,352 A * | 11/1998 | Prakash | 340/573.4 |
| 6,486,777 B2 * | 11/2002 | Clark | 340/539.1 |
| 6,529,131 B2 * | 3/2003 | Wentworth | 340/573.1 |
| 7,061,368 B2 * | 6/2006 | Okada | 340/5.6 |
| 7,106,191 B1 * | 9/2006 | Liberati | 340/539.15 |
| 7,148,800 B2 * | 12/2006 | Cunningham et al. | 340/539.11 |
| 7,696,887 B1 * | 4/2010 | Echavarria | 340/573.1 |
| 7,714,709 B1 * | 5/2010 | Daniel | 340/539.11 |
| 8,031,048 B2 * | 10/2011 | Hata | 340/5.72 |
| 8,507,168 B2 * | 8/2013 | Hiraoka et al. | 430/109.3 |
| 2001/0048364 A1 * | 12/2001 | Kalthoff et al. | 340/573.1 |
| 2002/0097152 A1 * | 7/2002 | Mengrone et al. | 340/571 |
| 2008/0100417 A1 * | 5/2008 | Hata | 340/5.72 |
| 2008/0311882 A1 * | 12/2008 | Schlager et al. | 455/404.2 |
| 2013/0250129 A1 * | 9/2013 | Patil et al. | 348/192 |
| 2014/0009283 A1 * | 1/2014 | Humbard | 340/539.12 |
| 2014/0055276 A1 * | 2/2014 | Logan et al. | 340/686.6 |

* cited by examiner

*Primary Examiner* — Julie Lieu
(74) *Attorney, Agent, or Firm* — Reches Patents

(57) ABSTRACT

A method and range monitoring system for verifying that communication between two communicating units is of satisfactory quality and that the units are within a predetermined range from one another, wherein the units are in non-continuous communication. One or both units test that the quality and distance by sending a signal to the other unit, and expecting a response signal. If no response signal is received, an alert is fired. The check is initiated upon a trigger, such as a timer, a sensed motion, or a user-initiated event such as when the user presses a button.

16 Claims, 3 Drawing Sheets

REMOTE UNIT LINK QUALITY MONITORING

TECHNICAL FIELD

The present disclosure relates to detecting whether communication between a remote unit and another unit is of satisfactory quality, and to baby monitor link quality and range monitoring, in particular.

BACKGROUND

Multiple devices are known, in which a base station communicates with a remote unit. Some examples include baby monitor in which a stationery device is located adjacent to the baby, for example in or near his bed, and a mobile unit is carried by a parent or another caregiver; a cordless phone having a handset and a base station; a dog collar having thereon a mobile unit that communicates with another unit which may be stationary or mobile, or the like. Such devices operate using a variety of technologies, such as radio signals carrying digital or analog link, (RF), or the like.

Some of these devices are equipped with link-quality or range detector, i.e., a mechanism that constantly monitors the distance or communication quality between the remote unit and the other unit, which may be stationary or also mobile. The detector provides an alert to the person in charge should the distance exceed a threshold, or should signals emitted by one unit not be received with satisfactory quality by the other unit. The indication may be provided vocally, visually, or in any other manner.

In recent years there is greater awareness to possible risks of excess integrated radiation absorbed by users. In particular, parents as well as pet owners are reluctant to expose their babies, children or pets to unnecessary radiation. Therefore such devices had been designed which broadcast non-continuously from the baby or pet side, and establish communication with the other unit only when necessary, for example when the baby cries or makes other sounds. During quite periods, the unit placed near the baby is not broadcasting, thus reducing the amount of radiation the baby is exposed to.

However, some radiation is still emitted near the baby, as frequent communication is maintained between the units, in order to verify that the distance between the units remains acceptable and that the link is reliable. Such verification is necessary, since otherwise the caregiver may not receive the required communication even when the other side is broadcasting, for example when the baby cries.

There is thus a need for reduced-communication link quality or range monitoring or detection mechanism to be used in wireless systems in order to verify that the two units are at most a predetermined distance apart, or that data communicated between the units is of satisfactory quality.

SUMMARY

A method and monitoring system for verifying communication between units, such as a stationary and mobile units of a baby monitor.

A first aspect of the disclosure relates to a method for verifying communication between a first unit and a second unit, the first unit adapted to communicate with the second unit, each of the first and the second units being a mobile or a stationary unit, the method comprising: the first unit receiving a trigger event; the first unit sending a request signal to the second unit; the first unit determining that a response signal was not received from the second unit or that a response signal is of low quality or intensity was received; and firing an alert, wherein the first unit and the second unit are adapted to communicate in a non-continuous manner. The method can further comprise testing a quality or intensity parameter of the response signal. The method can further comprise testing a quality or intensity parameter of the request signal and reporting results within the response signal. The method can further comprise testing that the first unit and the second unit are at most a predetermined distance apart. Within the method, the trigger event is optionally a timer event. Within the method, the timer event optionally depends on a distance between the first unit and the second unit. Within the method, the trigger event is optionally initiated by a user of the first unit. Within the method, the trigger event is optionally a sensed motion event. Within the method, the first unit is optionally a mobile part of a baby monitor and the second unit is a stationary part of a baby monitor. Within the method, the first unit is optionally a handset of a cordless phone and the second unit is a base station of the cordless phone.

Another aspect of the disclosure relates to a monitoring system for verifying communication between a first unit and a second unit, the first unit adapted to communicate with the second unit, each of the first and the second units being a mobile or a stationary unit, the monitoring system comprising: an event receiving component for receiving a trigger event; a signal sending component for sending a signal to the second unit; a signal receiving component for receiving a signal from the second unit; and an alert firing component for firing an alert if a response signal was not received from the second unit or that a response signal is of low quality or intensity was received, wherein the first unit and the second unit are adapted to communicate in a non-continuous manner. The unit can further comprise a range testing component for determining that the first unit and the second unit are at most a predetermined distance apart. The monitoring system can further comprise a signal testing component for testing a quality or intensity parameter of the response signal. Within the monitoring system, the trigger event is optionally a timer event. Within the monitoring system, the timer event optionally depends on a distance between the first unit and the second unit. Within the monitoring system, the trigger event is optionally initiated by a user of the first unit or is a sensed motion event. Within the monitoring system, the first unit is optionally a mobile part of a baby monitor and the second unit is a stationary part of a baby monitor. Within the monitoring system, the first unit is optionally a stationary part of a pet monitor and the second unit is a mobile part of a pet monitor. Within the monitoring system, the first unit is optionally a handset of a cordless phone and the second unit is a base station of the cordless phone.

BRIEF DESCRIPTION OF THE DRAWINGS

The present disclosure will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed method and link quality monitoring system provide for monitoring or verifying that the distance between a mobile unit and another mobile or stationary unit is below a threshold or that the communication between the units is of proper or satisfactory quality, in non-continuous communication mode of operation.

The method and monitoring system are thus particularly useful when communication between the units occurs only upon demand such as a user pressing a button, or upon a particular event, such as a voice-activated mechanism starting in response to received voice.

The method and monitoring system provide for monitoring the link quality or distance between the units, when a particular trigger is fired. The trigger may be fired volitionally by the user, for example by the user activating a check. In addition, other triggers may be system-initiated, for example when a predetermined period of time has passed since the last check, or when motion of a unit is sensed. It will be appreciated that additional triggers can be used, and that monitoring can be initiated upon any of a multiplicity of trigger types, and is not limited to a particular trigger type.

The check can be initiated from either unit, whether it is mobile or stationary. In some embodiments, the check can be started by any of the two units. The check includes sending a signal to the other unit, and receiving a response. If no response has been accepted, it is either that the units are too distant from one another, or there is another problem with their link quality, which the user has to be aware of.

Using the method and range monitoring system, when there is no vocal or other important communication between the units, no check is performed, unless a periodic check is required. However, when an event occurred, such as when one of the units moves, a motion sensor fires an event and it is verified that the units are within a required distance or that their communication quality is adequate. Thus, for example if a caregiver watching a baby goes out to the yard, as long as he is in motion, link quality checks will be carried out, and once the distance exceeds a threshold, an alert is provided.

In some embodiments, if the remote unit is in constant motion, the rate of checks can be related to the present link quality and the speed of motion, in order to avoid continuous or often checks. For example, when good link quality was verified and the remote unit is moving at slow rate, such as under a predetermined threshold, the range and quality will be checked less often than in other cases.

Also, if the user so desires, he can initiate a check. For example, if a dog or another pet having a leash with a monitor goes out on its own, the owner can periodically verify that the dog has not gone too far.

Figure 1:
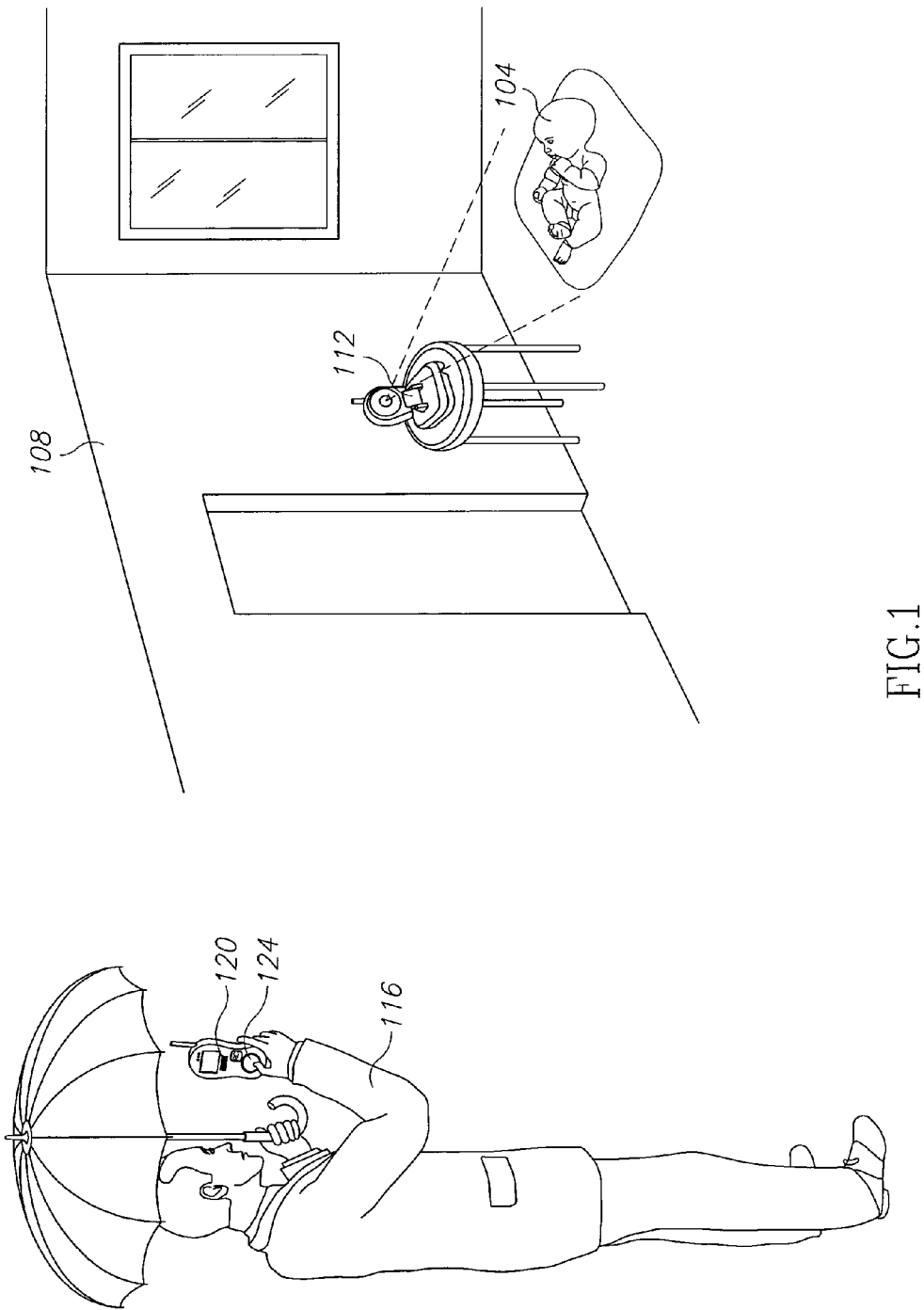
FIG. 1 is a schematic illustration of typical usage of a baby monitor.

Referring now to FIG. 1, showing a schematic illustration of an exemplary usage for the disclosed method and monitoring system.

Baby 104 is inside house 108, and is within the receiving range of base station 112 of a baby monitor system. Caregiver 116 can be inside or outside house 108, as long as he can hear the baby, either directly or through mobile unit 120 of the baby monitor.

In some embodiments, monitoring may be performed periodically, or when caregiver 116 wishes to monitor the link quality and distance by pressing button 124. In addition, a motion sensor may be present within mobile-unit 120, which initiates a link quality or range check when the unit is in motion, for example when caregiver 116 takes the mobile unit and goes out of the house. The monitoring initiated by motion sensing may be limited to a motion of at least a particular distance, so as not to perform unnecessary checks when the caregiver is walking within a room.

Figure 2:
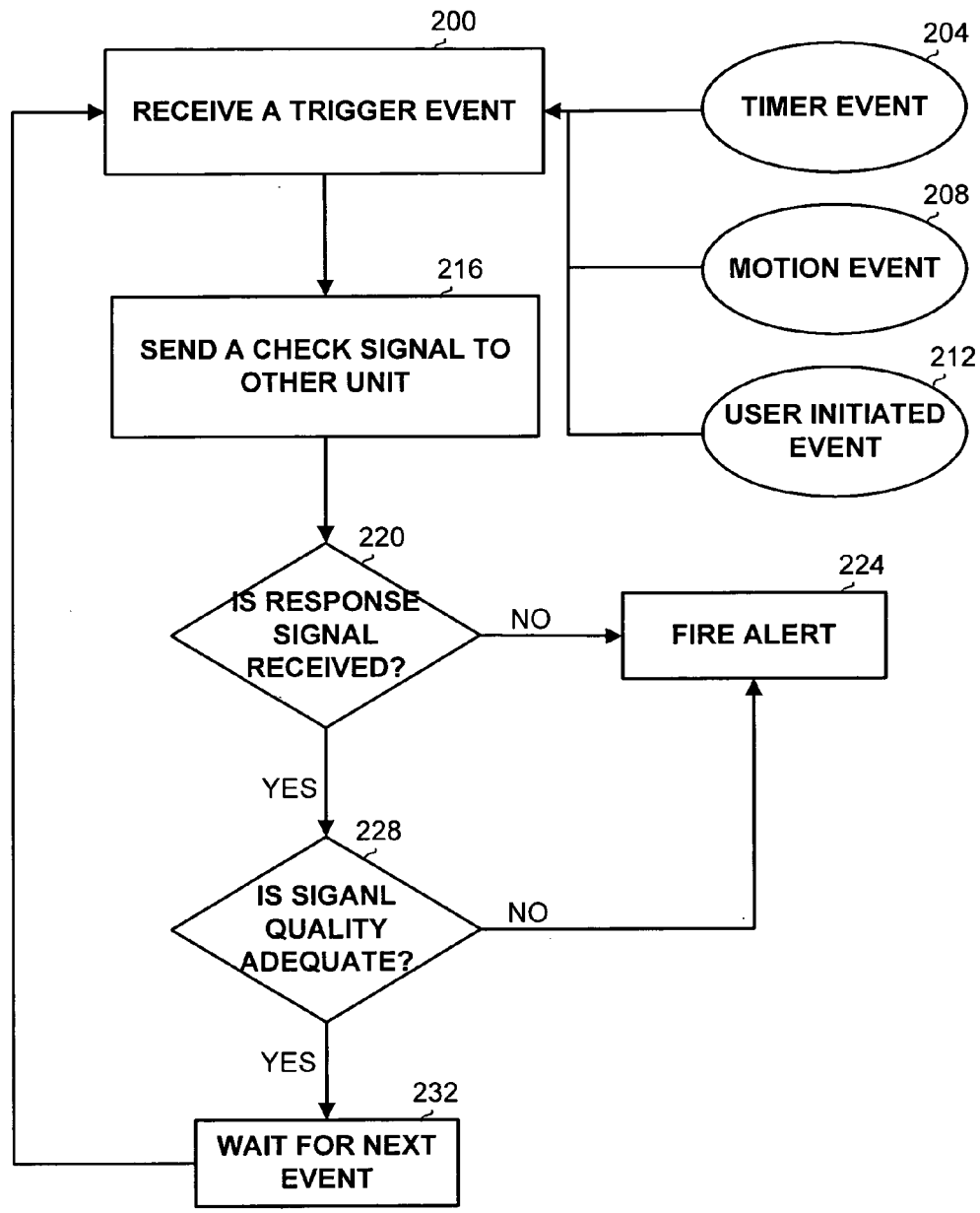
FIG. 2 is a flowchart of the main steps in an embodiment of a method for to non-continuous range detection, in accordance with the disclosure.

Referring now to FIG. 2, showing a flowchart of the main steps in a method for monitoring link quality and distance in non-continuous communication.

On trigger event receiving step 200, a trigger event is received by one of the units, whether it is mobile or stationary. The trigger event can be, for example, a timer event 204 indicating that a predetermined period of time has elapsed since the last check or since the units last communicated, or since the unit was activated or started; a motion event 208 indicating that the unit has moved, wherein the move may refer to a movement of a distance exceeding a predetermined threshold; or user initiated event 212, which may be fired when the user pressed a button, initiated voice-activated mechanism or the like. Motion event 208 can be fired by any motion sensor, such as using an accelerometer or electric pendulum switch.

On sending a check signal step 216, the unit that received the trigger event on step 200 sends a signal to the other unit. The signal can have any required duration, shape, amplitude or frequency. The receiving unit sends a response signal to the transmitting unit.

Optionally, the receiving unit can test the signal quality or an intensity parameter thereof, and report the results within the response signal.

On step 220 it is determined whether a response signal was received from the other unit. Step 220 can take place within a predetermined time period after step 216.

If the predetermined duration is over and no response signal has been received, an alert is fired on step 224, for example by activating a buzzer or making another sound, a vibrator, lighting a LED or the like.

If a response has been received, then on optional step 228 the response signal is tested for quality, amplitude, or the like, and optionally compared to a threshold. If the response signal is of non-satisfactory quality or intensity, an alert is fired on step 224. If the signal is satisfactory, it is deduced that the distance between the units is within the allowed range, and on step 232 the system waits for the next trigger event. Optionally, if non-satisfactory quality indication was received on the response signal from the receiving unit, an alert can be fired as well. The quality check can be performed either by the initiating-unit or by both units. When the link quality check is performed by both units, a feedback signal is sent from the non-initiating unit to the initiating unit, which carries the link-quality information for the link from the initiating unit to the other unit.

When a timer or motion sensor is set until the next time the link quality and range is to be monitored, it does not necessarily wait for a constant period of time or for motion to be sensed. For example, if the distance between the two units is small, or if a small motion was sensed, the time period until the next check can be set to be longer than if the units are farther apart or if a larger motion was sensed.

Figure 3:
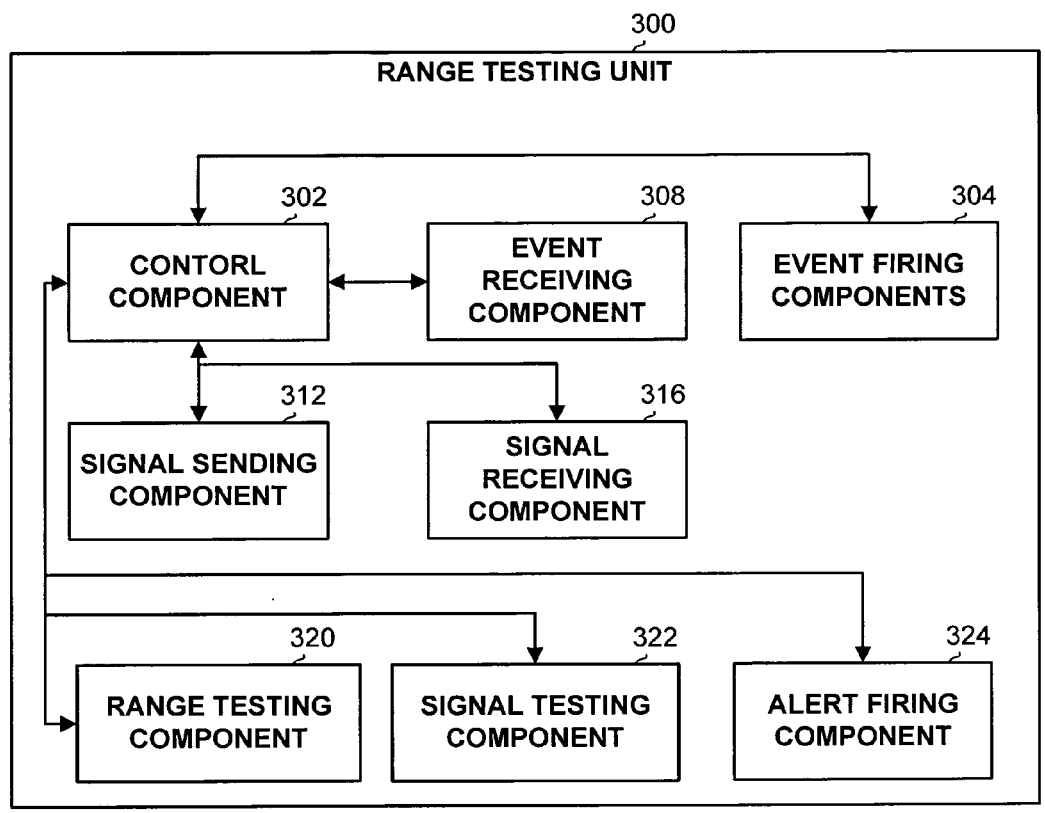
FIG. 3 is a block diagram of the main components in an embodiment of a range detection system, in accordance with the disclosure.

Referring now to FIG. 3, showing a block diagram of the main components in a link quality and range testing unit 300 which may be embedded as a part of any stationary or mobile device which communicates with another stationary or mobile device.

Control component 302 is responsible for activating the other components and handling the control and data flow in accordance with the method disclosed in association with FIG. 2 above.

Event firing components 304 are responsible for firing an event, in response to events such as a clock, a motion sensor, or a user-initiated event.

Event receiving component 308 is responsible for receiving the fired event, and determining whether to start a link quality and range check. For example, if motion was sensed but the distance is below a predetermined threshold, the check may be omitted.

Signal sending component 312 is responsible for sending a check signal to the other unit, and signal receiving component 316 is responsible for receiving the response signal from the other unit.

Range testing component 320 is responsible for testing that the distance between the units is under a predetermined threshold.

Signal testing component 322 is optional, and is responsible for testing the quality or intensity of the received signal, or for analyzing an indication to such test as sent from the other unit.

Alert firing component 324 is responsible for firing an alert if no signal is received, or if the received signal is of non-satisfactory quality or intensity, or if an indication to low quality signal is received from the other unit.

It will be appreciated that the block diagram demonstrates the logical structure of the unit, and that components of the block diagram can be shared with other functionalities of the communication device. For example, signal sending and receiving components 308 and 312 can use communication components of the device used for other purposes, such as transmitting and receiving voice, images, or data.

The steps of FIG. 2 above or the components of FIG. 3 above can be implemented as firmware ported for a specific processor such as digital signal processor (DSP) or microcontrollers, or can be implemented as hardware or configurable hardware such as field programmable gate array (FPGA) or application specific integrated circuit (ASIC). Alternatively, the method can be implemented as interrelated sets of computer instructions, arranged as executables, libraries, web pages, portals or other units designed to be executed by a computing platform such as a general purpose computer, a personal computer, a mainframe computer, a server, a mobile device, or any other type of computing platform provisioned with a memory device, a CPU or microprocessor device, and I/O ports.

The disclosed method and testing unit enable for verifying that a mobile unit and a stationary or mobile unit are within a required distance from one another and that the quality of the link between the units is satisfactory, while operating non-continuous communication between the units.

The method and range monitoring system thus provide for reducing the amount of radiation emitted from either unit to a nearby person or animal, as well as for saving energy.

It will be appreciated that various modifications and variations can be designed. For example, additional triggers can be used, or different divisions into steps of components can be designed.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation, material, step of component to the teachings without departing from the essential scope thereof. Therefore, it is intended that the disclosed subject matter not be limited to the particular embodiment disclosed as the best mode contemplated for carrying out this invention, but only by the claims that follow.

What is claimed is:

1. A method for verifying communication between a first unit and a second unit, the first unit adapted to communicate with the second unit, the first unit being a mobile unit or a stationary unit and the second unit being a mobile unit, the method comprising:
   performing multiple checks; wherein each check comprises: the first unit receiving a trigger event; the first unit sending a request signal to the second unit; the first unit determining that a response signal was not received from the second unit or that a response signal is of low quality or intensity was received; firing an alert, wherein the two units are adapted to communicate in a non-continuous manner; and testing a quality or intensity parameter of the response signal;
   wherein when the second unit moves at a speed that is below a predefined threshold the multiple checks are executed at a first rate; wherein when the second unit moves at a speed that is above the predefined threshold the multiple checks are executed at a second rate, wherein the first rate is lower than the second rate.

2. The method of claim 1 wherein the trigger event is initiated by a user of the first unit.

3. The method of claim 1 wherein the trigger event is a sensed motion event.

4. A method for verifying communication between a first unit and a second unit, the first unit adapted to communicate with the second unit, the first unit being a mobile unit or a stationary unit and the second unit being a mobile unit, the method comprising:
   performing multiple checks; wherein each check comprises: the first unit receiving a trigger event; the first unit sending a request signal to the second unit; the first unit determining that a response signal was not received from the second unit or that a response signal is of low quality or intensity was received; firing an alert, wherein the two units are adapted to communicate in a non-continuous manner; and testing a quality or intensity parameter of the request signal and reporting results within the response signal;
   wherein when the second unit moves at a speed that is below a predefined threshold the multiple checks are executed at a first rate; wherein when the second unit moves at a speed that is above the predefined threshold the multiple checks are executed at a second rate, wherein the first rate is lower than the second rate.

5. A method for verifying communication between a first unit and a second unit, the first unit adapted to communicate with the second unit, the first unit being a mobile unit or a stationary unit and the second unit being a mobile unit, the method comprising:
   performing multiple checks, wherein each check comprises: the first unit receiving a trigger event; the first unit sending a request signal to the second unit; the first unit determining that a response signal was not received from the second unit or that a response signal is of low quality or intensity was received; firing an alert, wherein the two units are adapted to communicate in a non-continuous manner; and testing that the first unit and the second unit are at most a predetermined distance apart;
   wherein when the second unit moves at a speed that is below a predefined threshold the multiple checks are executed at a first rate; wherein when the second unit moves at a speed that is above the predefined threshold the multiple checks are executed at a second rate, wherein the first rate is lower than the second rate.

6. A method for verifying communication between a first unit and a second unit, the first unit adapted to communicate with the second unit, the first unit being a mobile unit or a stationary unit and the second unit being a mobile unit, the method comprising:

the first unit receiving a trigger event; the first unit sending a request signal to the second unit; the first unit determining that a response signal was not received from the second unit or that a response signal is of low quality or intensity was received; and firing an alert, wherein the two units are adapted to communicate in a non-continuous manner; wherein the trigger event is a timer event; wherein the timer event depends on a distance between the first unit and the second unit.

7. A method for verifying communication between a first unit and a second unit, the first unit adapted to communicate with the second unit, the method comprising:

performing multiple checks, wherein each check comprises: the first unit receiving a trigger event; the first unit sending a request signal to the second unit; the first unit determining that a response signal was not received from the second unit or that a response signal is of low quality or intensity was received; and firing an alert, wherein the two units are adapted to communicate in a non-continuous manner; wherein the first unit is a mobile part of a baby monitor and the second unit is a stationary part of a baby monitor;

wherein when the response signal is of the low quality the multiple checks are executed at a first rate; wherein when the response signal is of a quality that exceeds the low rate the multiple checks are executed at a second rate, wherein the first rate is higher than the second rate.

8. A method for verifying communication between a first unit and a second unit, the first unit adapted to communicate with the second unit, the method comprising: the first unit receiving a trigger event; the first unit sending a request signal to the second unit;

performing multiple checks, wherein each check comprises: the first unit determining that a response signal was not received from the second unit or that a response signal is of low quality or intensity was received; and firing an alert, wherein the two units are adapted to communicate in a non-continuous manner; wherein the first unit is a handset of a cordless phone and the second unit is a base station of the cordless phone;

wherein when the response signal is of the low quality the multiple checks are executed at a first rate; wherein when the response signal is of quality that exceeds the low rate the multiple checks are executed at a second rate, wherein the first rate is higher than the second rate.

9. A monitoring system for verifying communication between a first unit and a second unit, the first unit adapted to communicate with the second unit, the first unit being a mobile or a stationary unit and the second unit being a mobile or a stationary unit, the monitoring system comprising:

an event receiving component for receiving multiple trigger events;

a signal sending component for sending, in response to each trigger event, a signal to the second unit;

a signal receiving component for receiving a signal from the second unit;

an alert firing component for firing an alert if a response signal was not received from the second unit or that a response signal is of low quality or intensity was received, wherein the first unit and the second unit are adapted to communicate in a non-continuous manner; and a range testing component for determining that the first unit and the second unit are at most a predetermined distance apart;

wherein the trigger events are sent at a first rate wherein when the second unit moves at a speed that is below a predefined threshold; wherein when the trigger events are sent at a second rate when the second unit moves at a speed that is above the predefined threshold, wherein the first rate is lower than the second rate.

10. The monitoring system of claim 9 wherein the trigger event is a sensed motion event.

11. A monitoring system for verifying communication between a first unit and a second unit, the first unit adapted to communicate with the second unit, the first unit being a mobile or a stationary unit and the second unit being a mobile or a stationary unit, the monitoring system comprising:

an event receiving component for receiving multiple trigger events;

a signal sending component for sending, in response to each trigger event, a signal to the second unit;

a signal receiving component for receiving a signal from the second unit; an alert firing component for firing an alert if a response signal was not received from the second unit or that a response signal is of low quality or intensity was received, wherein the first unit and the second unit are adapted to communicate in a non-continuous manner; and a signal testing component for testing a quality or intensity parameter of the response signal;

wherein the trigger events are sent at a first rate wherein when the second unit moves at a speed that is below a predefined threshold; wherein when the trigger events are sent at a second rate when the second unit moves at a speed that is above the predefined threshold, wherein the first rate is lower than the second rate.

12. A monitoring system for verifying communication between a first unit and a second unit, the first unit adapted to communicate with the second unit, the first unit being a mobile or a stationary unit and the second unit being a mobile or a stationary unit, the monitoring system comprising: an event receiving component for receiving trigger events; a signal sending component for sending , in response to each trigger event, a signal to the second unit; a signal receiving component for receiving a signal from the second unit; and an alert firing component for firing an alert if a response signal was not received from the second unit or that a response signal is of low quality or intensity was received, wherein the first unit and the second unit are adapted to communicate in a non-continuous manner; wherein the trigger event is a timer event; wherein the timer event depends on a distance between the first unit and the second unit.

13. The monitoring system of claim 9 wherein the trigger event is initiated by a user of the first unit.

14. A monitoring system for verifying communication between a first unit and a second unit, the first unit adapted to communicate with the second unit, the monitoring system comprising: an event receiving component for receiving trigger events; a signal sending component for sending, in response to each trigger event, a signal to the second unit; a signal receiving component for receiving a signal from the second unit; and an alert firing component for firing an alert if a response signal was not received from the second unit or that a response signal is of low quality or intensity was received, wherein the first unit and the second unit are adapted to communicate in a non-continuous manner; wherein the first unit is a mobile part of a baby monitor and the second unit is a stationary part of a baby monitor; wherein when the response signal is of the low quality the multiple checks are executed at a first rate; wherein when the response signal is of a quality that exceeds the low rate the multiple checks are executed at a second rate, wherein the first rate is higher than the second rate.

15. A monitoring system for verifying communication between a first unit and a second unit, the first unit adapted to communicate with the second unit, the monitoring system comprising: an event receiving component for receiving multiple trigger events; a signal sending component for sending, in response to each trigger event, a signal to the second unit; a signal receiving component for receiving a signal from the second unit; and an alert firing component for firing an alert if a response signal was not received from the second unit or that a response signal is of low quality or intensity was received, wherein the first unit and the second unit are adapted to communicate in a non-continuous manner; wherein the first unit is a stationary part of a pet monitor and the second unit is a mobile part of a pet monitor; wherein when the second unit moves at a speed that is below a predefined threshold the multiple checks are executed at a first rate; wherein when the second unit moves at a speed that is above the predefined threshold the multiple checks are executed at a second rate, wherein the first rate is lower than the second rate.

16. A monitoring system for verifying communication between a first unit and a second unit, the first unit adapted to communicate with the second unit, the monitoring system comprising: an event receiving component for receiving multiple trigger events; a signal sending component for sending, in response to each trigger event, a signal to the second unit; a signal receiving component for receiving a signal from the second unit; and an alert firing component for firing an alert if a response signal was not received from the second unit or that a response signal is of low quality or intensity was received, wherein the first unit and the second unit are adapted to communicate in a non-continuous manner; wherein the first unit is a handset of a cordless phone and the second unit is a base station of the cordless phone; wherein when the response signal is of the low quality the multiple checks are executed at a first rate; wherein when the response signal is of a quality that exceeds the low rate the multiple checks are executed at a second rate, wherein the first rate is higher than the second rate.

* * * * *